Patented Sept. 16, 1941

2,256,392

UNITED STATES PATENT OFFICE 2,256,392

THERAPEUTICS

Kenneth C. D. Hickman, Rochester, N. Y., assignor to Distillation Products, Inc., Rochester, N. Y., a corporation of Delaware No Drawing. Application October 14, 1939
Serial No. 299,523

6 Claims. (Cl. 260—412.1)

This invention relates to the preparation of improved vitamin products and more particularly to the preparation of vitamin oils from fish tissue, which, upon distillation, will yield improved vitamin products.

In the fish oil industry, it is common procedure to remove oils from fish tissue, such as fish liver and entrails, in a plurality of stages. The first oil removed generally has excellent characteristics and is separately collected and sold as a first-grade oil. The fish tissue is then further treated to remove second and third-grade oils, which command a lower price and which are usually so unstable and otherwise undesirable that they are mainly used as animal feeds. The procedure used in extracting such second and third-grade oils involves mixing the fish tissue with a low potency and cheap fish oil which acts as a solvent for the oil to be extracted. Any low grade oil which happens to be available at the extraction plant is usually employed for this purpose. Sardine body oil or cheap cod liver oil are examples of oils which usually are added to the fish livers to dissolve and take up the residual second and third-grade oils. This expedient is also often used to remove the first-grade oils from the fish tissue. In many cases the fish liver, etc. contains so little oil that it cannot be effectively separated therefrom. The addition of extraction oils is, therefore, advantageous on the score of yield, but it may have the disadvantage of conferring on the extract some of the undesirable qualities of the diluent oil used.

This invention has for its object to provide improved procedure for preparing oils from fish tissue, such as fish liver. Another object is to provide improved solvents for removing fish oils from fish tissue, said solvents not conferring undesirable properties on the extracted oil. A further object is to provide a process for removing oils from fish tissue which will yield an extract having superior qualities. A still further object is to provide, in combination, improved procedure for removing fish oils from fish tissue, and recovering improved vitamin concentrates therefrom by high vacuum distillation. Other objects will become apparent from the following description and claims.

These and other objects are accomplished by my invention, which includes extracting the oils from the fish tissue with a solvent for the oils which will impart desirable properties thereto, and more particularly, will result in a vacuum distillate of superior qualities.

In the following description and claims, I have set forth several of the preferred embodiments of my invention, but it is to be understood that they are given for the purpose of illustration and not in limitation thereof.

According to one modification of my invention, the fish tissue is extracted with an oil or solvent which has been treated in a high-vacuum still to remove substantially all of the components which will be volatile under conditions in which the fat-soluble fish vitamins distill. A typical example of such a solvent is the residue oil left when an oil containing vitamins, such as cod-liver oil, is subjected to high vacuum, unobstructed path distillation such as molecular distillation. In such procedures the vitamins, sterols, fatty acids, and the higher vapor pressure glycerides are first distilled, leaving a residue composed of glycerides of very low vapor pressure which distill at much higher temperature than the vitamins. In many cases they are almost non-volatile even under molecular distillation conditions.

When the fish tissue is extracted with a solvent of this type, the fish oils contained in the tissue are as effectively removed as if cod liver oil or other prior art solvents were employed. Upon high vacuum distillation of this extract mixture, the vitamins will be directly distilled therefrom without contamination with volatile constituents which would otherwise be present in the prior art solvents, such as cod liver oil. In other words, the extract mixture distills in much the same way as if the oil contained in the fish tissue were directly distilled, unmixed with any solvent. The advantages in such procedure are manifest, one of the most important being that a high potency distillate is immediately obtained by one distillation in a simple manner.

Low vapor pressure solvents of this nature can be prepared by treating oil or vitamin solvents containing low vapor pressure constituents in a high vacuum still. All of the volatiles can be thus removed to leave a residue having the desired vapor pressure characteristics. Although it is advantageous from an economical standpoint to employ still residues obtained as a by-product from commercial vacuum distillation of vitamins etc. from fish oils, these by-products are by no means the only kinds of low vapor pressure solvents which can be effectively used. Vegetable and animal oils, in general, such as soybean, castor, cottonseed, linseed, whale oil, etc. can be robbed of their volatile constituents by vacuum and preferably high vacuum, unobstructed path distillation and used for this purpose. In particular I contemplate the use of vegetable residue oils because the traces of such oils that inevitably distill during the distillation of the vitamins do not confer any of the fishy flavor which may arise when residue fish oils are used as the extractant. Also, solvents of a non-glyceride nature, such as petroleum distillates of low vapor pressure and freed of their volatile components, are very satisfactory solvents.

The type of distillation employed to distill the solvent-extracted oil mixture is that known in the art as high vacuum, unobstructed path distillation. This distillation involves heating the distilland to distillation temperature in a high vacuum and in apparatus such that the heated distilland and the condensing surface are separated by substantially unobstructed space. If the distance between the heated distilland and the condensing surface is relatively small, such as 12 inches or less and preferably between about .5 and 6 inches, the distillation is known as high vacuum, short path distillation. When the distance between the heated distilland and the condensing surface is less than the average distance that a vapor molecule travels before colliding with a molecule of residual gas, the distillation is known as molecular distillation. All of such distillations are known in the prior art to be useful for recovering vitamins from natural oils and will be designated herein as high vacuum, unobstructed path distillation.

According to another modification of my invention, I contemplate extracting the oils from the fish tissue, such as fish liver, with a vegetable or animal oil which contains a natural antioxidant in substantial amounts. The antioxidant present in the vegetable or animal oil stabilizes the extracted fish oil and preserves the vitamins therein against destruction, and also prevents the fish oil from turning rancid. Natural oils containing antioxidants are of unique advantage in this connection because they are effective solvents for the fish oils, and they are also quite free of substances which impart poisonous or harmful characteristics to the distillate from the subsequent high vacuum unobstructed path distillation.

The natural oil containing antioxidant is employed as an extractant in the same manner as described above, either upon the fresh fish livers or upon the extracted fish livers, or other tissue, from which the second or third-grade oil is to be removed. The extractant mixture then may be subjected to high vacuum unobstructed path distillation to obtain vitamin concentrates as distillate. Those natural antioxidants contained in the solvent oil which distill at the same temperature as the vitamin appear in the distillates so that a vitamin distillate concentrate of great stability is obtained.

This procedure has manifest advantages. The practice, heretofore, was to employ any cheap oil which came to hand. Many such oils were rancid and contained oxidation products, which catalyzed the destruction of the vitamins extracted from the fish livers. In the fish industry, little or no attention has been paid to the idea of using extractants having desirable qualities. This probably is due to the fact that the extracted oils were usually of low grade and have no commercial use, except as animal feed. However, my improved procedure yields an extract which has properties as good as first-grade oils. It also yields an extract which is excellently suited for high vacuum, unobstructed path distillation to yield distillates containing vitamins of high quality. Therefore, this procedure promotes an oil of low grade to one of high grade, or to one which can be distilled to yield concentrates of first-class quality.

By a modification a blended solvent can be used consisting of a residue or low vapor pressure oil and an untreated vegetable or animal oil of high antioxidant content. In this way the quantity of antioxidant is adjusted without raising the bulk of the distillate to a point where the potency of the fish tissue vitamin is lowered unduly.

Most vegetable and animal oils contain natural antioxidants. Their content thereof varies, depending upon age of the oil, its manner of extraction, its manner of storage, the refining treatments used in refining it, etc. The vegetable oils, as a class, are richer in natural antioxidants than the animal oils. Examples of rich vegetable oils are cottonseed, corn, soybean, and wheatgerm oil. Fresh fish oils, such as fresh, uncontaminated and unrefined cod liver, greyfish liver, halibut liver, etc. oils contain useful amounts thereof. It is best to use a fresh oil, and it is important to use an unrefined oil or a refined oil which has been refined in such a manner that the antioxidant has not been destroyed. Drastic alkali refining treatment has been found to destroy the natural antioxidant content of oils.

It is becoming recognized that almost every oil from natural sources contains a vitamin, hormone, or other biologically active constituent appropriate to the source. It is also becoming common practice to compound medicinals and proprietary pills, capsules, etc., to contain more than one vitamin. A well-known example is the A—D concentrates sold in drug stores. Other examples are blends of A and E, E and K, or A, D, E and K. It is contemplated as part of my invention to use as extractant oils for vitamins A and D obtained from fish tissue, oils which provide appropriate quantities of other vitamins desired in the finished product. Thus to prepare an A, D, E, K blend, a mixture of halibut and tuna livers would be extracted with a mixture of crude soybean and wheatgerm oils. The extract would be processed by high-vacuum unobstructed path distillation to yield a concentrate of the desired vitamin mixture.

I contemplate using a combination of the above described expedients. For instance the low vapor pressure extractant expedient can be conveniently combined with the natural antioxidant expedient by mixing the low vapor pressure solvent with an oil containing a large amount of natural antioxidant. In this way the advantages of both procedures are obtained, namely, a distillate substantially free of all volatiles and a distillate product of good odor, taste, and potency, due to the presence of the natural antioxidant. Likewise the low vapor pressure and/or antioxidant expedient can be combined with the expedient of using a vitamin containing solvent.

*Example 1*

1,000 pounds of skipjack livers are macerated and heated with alkali in the usual manner or with alkali plus an oxygen absorber, as in my co-pending application No. 298,967 filed October 11, 1939. To the mass with agitation, are added 100 pounds of soybean oil which has previously been passed through a high-vacuum still so that

Example 2

Soupfin shark livers are treated as in Example 1, but in the place of soybean oil residue, sardine residue oil is used as extractant, together with 20 pounds of crude corn oil of high antioxidant potency.

Example 3

1,000 pounds of halibut-liver are macerated and extracted at 160° with 100 pounds of sesame oil. The slurry is centrifuged and the oil which is separated is found to be light in color, exceptionally free from odor, and with high resistance to oxidation. In an extension of this example, the mixed, extracted oil is subjected to high-vacuum, short-path distillation and a fraction of vitamin A distillate is separated in a 70 per cent yield and a potency in excess of half-a-million units per gram. The keeping qualities of the vitamin A distillate are noticeably superior to those of a similar distillate prepared from oil extracted by unconventional procedure.

Example 4

1,000 pounds of bluefin tuna livers are extracted using petroleum distillate having a boiling range of 100–200° C. at $\frac{1}{10}$ mm. absolute. To the mixture are added 20 pounds of crude corn oil of high antioxidant properties. After separation by centrifugal force, the extracted oil is passed through a high-vacuum still, at least one member of which is of the surface evaporator short-path type, and the mineral oil is removed substantially completely. In an extension of this example, the tuna-liver oil is itself distilled in an additional high vacuum still and a distillate containing vitamins A and D in high potency and high yield is secured.

What I claim is:

1. The process which comprises extracting an oil from fish tissue by means of a solvent which has been freed of all volatile constituents by high vacuum distillation and which substantially contains only constituents having a lower vapor pressure than the vitamins contained in the fish tissue being extracted.

2. The process of extracting fish tissue to remove vitamin-containing oils therefrom, which comprises employing, as an extractant solvent, a low vapor pressure natural oil which contains a natural antioxidant, which low vapor pressure oil has been subjected to high vacuum distillation to remove all volatile constituents which have a volatility the same as or greater than that of the vitamin content in the fish tissue.

3. The process of extracting fish tissue to remove vitamin containing oils therefrom which comprises extracting the tissue with an oil solvent which has a low vapor pressure and which contains only constituents which have a vapor pressure different from that of the vitamins contained in the extracted fish oil, said solvent being the still residue which is obtained when a vegetable or animal oil is incompletely distilled in a high vacuum, unobstructed path still.

4. The process which comprises, in combination, extracting fish tissue with a solvent for the oil contained therein, which solvent contains only substances having a vapor pressure lower than the vapor pressure of the vitamins contained in the fish tissue, removing the solvent and extracted oil from the fish tissue, subjecting it to high vacuum unobstructed path distillation and separating a vitamin concentrate as a distillate.

5. The process which comprises, in combination, extracting oil from fish liver with a low vapor pressure solvent which has been freed of substantially all volatiles contained therein by high vacuum distillation, separating the solvent and oil from the fish liver tissue and then subjecting the solvent-oil mixture to vacuum distillation to separate the vitamin content thereof.

6. The process of preparing an improved vitamin-containing fish oil which comprises in combination subjecting fish tissue which contains a vitamin oil to a treatment which will remove most of the oil therefrom and then extracting the fish tissue residue from which most of the oil has been removed with a low vapor pressure solvent, comprising a vegetable or animal oil, which contains substantially no components having a vapor pressure the same as or higher than the vitamin contained in the fish tissue, said vegetable or animal oil being one which has been subjected to high vacuum, unobstructed path distillation to remove all volatile components therefrom.

KENNETH C. D. HICKMAN.